(12) United States Patent
Wu et al.

(10) Patent No.: US 9,715,737 B2
(45) Date of Patent: Jul. 25, 2017

(54) IMAGING ADJUSTING METHOD CAPABLE OF VARYING SCALING RATIOS AND RELATED CAMERA AND IMAGE PROCESSING SYSTEM

(71) Applicant: VIVOTEK INC., New Taipei (TW)

(72) Inventors: Jen-Chih Wu, New Taipei (TW); Chih-Chiang Chen, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 14/985,362

(22) Filed: Dec. 30, 2015

(65) Prior Publication Data

US 2016/0203584 A1 Jul. 14, 2016

(30) Foreign Application Priority Data

Jan. 12, 2015 (TW) .............................. 104100983 A

(51) Int. Cl.
*G06K 9/00* (2006.01)
*G06T 7/00* (2017.01)
*G06T 3/00* (2006.01)

(52) U.S. Cl.
CPC .......... *G06T 7/0085* (2013.01); *G06T 3/0012* (2013.01)

(58) Field of Classification Search
None
See application file for complete search history.

(56) References Cited

U.S. PATENT DOCUMENTS

| 4,790,028 | A | * | 12/1988 | Ramage | .............. | G06F 3/04845 345/173 |
| 5,689,287 | A | * | 11/1997 | Mackinlay | ............ | G06T 3/0025 345/427 |
| 6,073,036 | A | * | 6/2000 | Heikkinen | .......... | G06F 3/04842 379/354 |
| 6,788,311 | B1 | * | 9/2004 | Ketrenos | ................ | G09G 5/391 345/660 |
| 6,975,335 | B2 | * | 12/2005 | Watanabe | ............. | G06F 3/0481 345/660 |
| 7,715,656 | B2 | * | 5/2010 | Zhou | ..................... | G06T 3/0018 345/650 |
| 7,760,187 | B2 | * | 7/2010 | Kennedy | ............... | G06F 3/0414 345/173 |
| 7,792,372 | B2 | * | 9/2010 | Ryu | ..................... | H04N 19/117 348/384.1 |

(Continued)

FOREIGN PATENT DOCUMENTS

| CN | 101212557 A | 7/2008 |
| CN | 102207810 A | 10/2011 |
| TW | 201410016 A | 3/2014 |

*Primary Examiner* — Soo Park
(74) *Attorney, Agent, or Firm* — Winston Hsu

(57) ABSTRACT

An image adjusting method capable of varying scaling ratios according to different regions of an image includes setting a first ROI (region of interest) circle on the image, acquiring a center of the first ROI circle to be a first reference point for setting at least one first bridging region circle, and utilizing a first scaling ratio, a second scaling ratio and a third scaling ratio to respectively adjust pixels of the first ROI circle, pixels between the first bridging region circle and the first ROI circle, and pixels out of the first bridging region circle. Dimension of the first bridging region circle is greater than dimension of the first ROI circle, and the first scaling ratio and the third scaling ratio are greater than the second scaling ratio. Further, the foresaid image adjusting method is applied to a camera and a related image processing system with image adjusting function.

17 Claims, 6 Drawing Sheets

(56) References Cited

U.S. PATENT DOCUMENTS

| | | | | |
|---|---|---|---|---|
| 8,106,927 | B2* | 1/2012 | Shoemaker | G06T 5/006 345/665 |
| 8,139,089 | B2* | 3/2012 | Doyle | G06F 3/0481 345/619 |
| 8,149,248 | B2* | 4/2012 | Ko | G09B 29/106 345/660 |
| 8,218,895 | B1* | 7/2012 | Gleicher | G06T 3/0025 345/427 |
| 8,237,666 | B2* | 8/2012 | Soo | G06F 3/0416 345/173 |
| 8,595,653 | B2* | 11/2013 | Glaser-Seidnitzer | G06F 3/0482 715/862 |
| 9,311,965 | B2* | 4/2016 | Hwang | G06F 3/04847 |
| 9,384,412 | B2* | 7/2016 | Shankaramurthy | G06K 9/46 |
| 2001/0038390 | A1* | 11/2001 | Takaya | G06F 3/04845 345/671 |
| 2004/0125138 | A1* | 7/2004 | Jetha | G06F 3/0481 715/764 |
| 2005/0047629 | A1* | 3/2005 | Farrell | G06F 3/013 382/117 |
| 2005/0162447 | A1* | 7/2005 | Tigges | G06F 3/0481 345/661 |
| 2006/0078226 | A1* | 4/2006 | Zhou | G06T 3/0018 382/298 |
| 2007/0209025 | A1* | 9/2007 | Jing | G06F 17/30265 |
| 2008/0077871 | A1* | 3/2008 | Baar | G06F 3/0481 715/762 |
| 2010/0171766 | A1* | 7/2010 | Jones | G06T 3/0018 345/671 |

\* cited by examiner

IMAGING ADJUSTING METHOD CAPABLE OF VARYING SCALING RATIOS AND RELATED CAMERA AND IMAGE PROCESSING SYSTEM

BACKGROUND OF THE INVENTION

1. Field of the Invention

The present invention relates to an image adjusting method and a related camera and image processing system, and more particularly, to an image adjusting method capable of varying scaling ratios according to different regions of an image and a related camera and a related image processing system.

2. Description of the Prior Art

The current surveillance camera is a high quality image capturing apparatus, and details can be clearly watched in the captured image. Due to constraint of transmission bandwidth and storage quantity, the high-resolution image is transformed into the low-resolution image before transmission to increase transmission speed and economize storage space. However, details on the image is reduced while the high-resolution image is transformed into the low-resolution image, the user is difficult to distinguish the monitoring object from the low-resolution image. Thus, design of an image adjusting method capable of maintaining the monitoring region as high quality is an important issue in the related industry.

SUMMARY OF THE INVENTION

The present invention provides an image adjusting method capable of varying scaling ratios according to different regions of an image and a related camera and a related image processing system for solving above drawbacks.

According to the claimed invention, an image adjusting method capable of varying scaling ratios according to different regions of an image is disclosed. The image adjusting method includes setting a first ROI (region of interest) circle on the image, acquiring a center of the first ROI circle to be a first reference point, setting at least one first bridging region circle by the first reference point, and utilizing a first scaling ratio, a second scaling ratio and a third scaling ratio to respectively adjust pixels inside the first ROI circle, pixels between the first bridging region circle and the first ROI circle, and pixels out of the first bridging region circle. A dimension of the first bridging region circle is greater than a dimension of the first ROI circle;

According to the claimed invention, a camera with an image adjusting function includes an image sensor and a processing unit. The image sensor is adapted to capture at least one image. The processing unit is coupled to the image sensor and adapted to execute an image adjusting method of setting a first ROI (region of interest) circle on the image, acquiring a center of the first ROI circle to be a first reference point, setting at least one first bridging region circle by the first reference point, and utilizing a first scaling ratio, a second scaling ratio and a third scaling ratio to respectively adjust pixels inside the first ROI circle, pixels between the first bridging region circle and the first ROI circle, and pixels out of the first bridging region circle, wherein a dimension of the first bridging region circle is greater than a dimension of the first ROI circle.

According to the claimed invention, an image processing system capable of varying scaling ratios according to different regions on an image to provide preferred resolution for a ROI (region of interest) circle on the image is disclosed. The image processing system is applied to execute an image adjusting method of setting a first ROI (region of interest) circle on the image, acquiring a center of the first ROI circle to be a first reference point, setting at least one first bridging region circle by the first reference point, and utilizing a first scaling ratio, a second scaling ratio and a third scaling ratio to respectively adjust pixels inside the first ROI circle, pixels between the first bridging region circle and the first ROI circle, and pixels out of the first bridging region circle, wherein a dimension of the first bridging region circle is greater than a dimension of the first ROI circle.

The image adjusting method of the present invention defines the ROI circle for containing the specific object on the image, and sets the bridging region circle by the center of the ROI circle (the dimension of the bridging region circle is larger than the dimension of the ROI circle). Pixels inside the ROI circle, between the ROI circle and the bridging region circle, and out of the bridging region circle are respectively adjusted by different scaling ratios. The image adjusting method can utilize affine transform technique and/or perspective transform technique to execute projection transformation of blocks on the image by software or built-in hardware, so as to effectively increase operation efficiency of coordinate transformation. The scaling ratio applied to the pixels inside the ROI circle is larger, so that the portion inside the ROI circle is slightly adjusted for maintaining high resolution about the specific object within the image; the scaling ratio applied to the pixels out of the bridging region circle is designed according to total scaling quantity of the image; the scaling ratio applied to the pixels between the ROI circle and the bridging region circle is preferably smaller than the foresaid two scaling ratios, so as to naturally stitch the deformed portions on the region of interest and the region of non-interest. In addition, the ROI circle and the bridging region circle of the present invention can be the circular form, the elliptical form, or any kind of round shape. The image adjusting method and the related camera and the image processing system of the present invention have advantages of preferred image scaling effect and high resolution.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
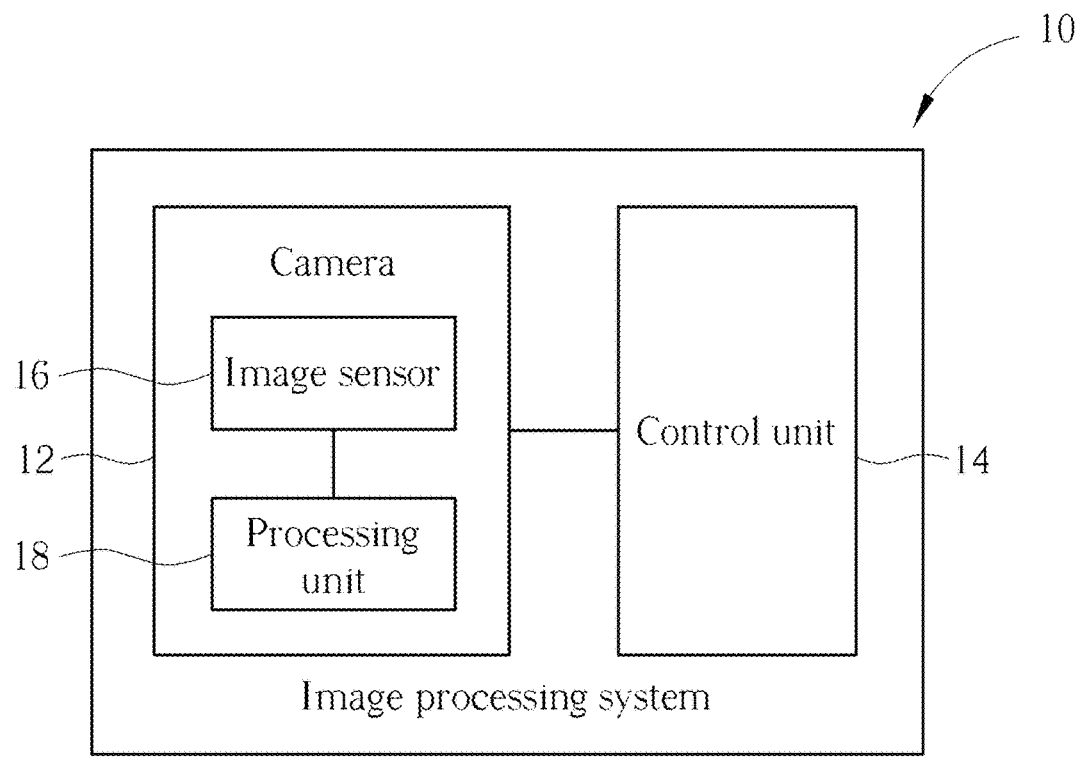
FIG. 1 is a functional block diagram of an image processing system according to an embodiment of the present invention.

Please refer to FIG. 1. FIG. 1 is a functional block diagram of an image processing system 10 according to an embodiment of the present invention. The image processing system 10 includes a camera 12 and a control unit 14 coupled to each other. The control unit 14 can receive images captured by one or more cameras 12 and vary a scaling ratio of a specific region according to different regions on the image, so as to provide the region of interest (Region of Interest, ROI) from the image with preferred resolution for clear identification Further, the camera 12 can include an image sensor 16 and a processing unit 18. The image sensor 16 is mainly utilized to capture the image. The processing unit 18 is coupled to one or more image sensors 16, to execute an image adjusting method capable of varying the scaling ratio according to different regions on the image. It is to say, an image adjusting function of the camera 12 can be executed by the external control unit 14 or the internal processing unit 18.

Figure 2:
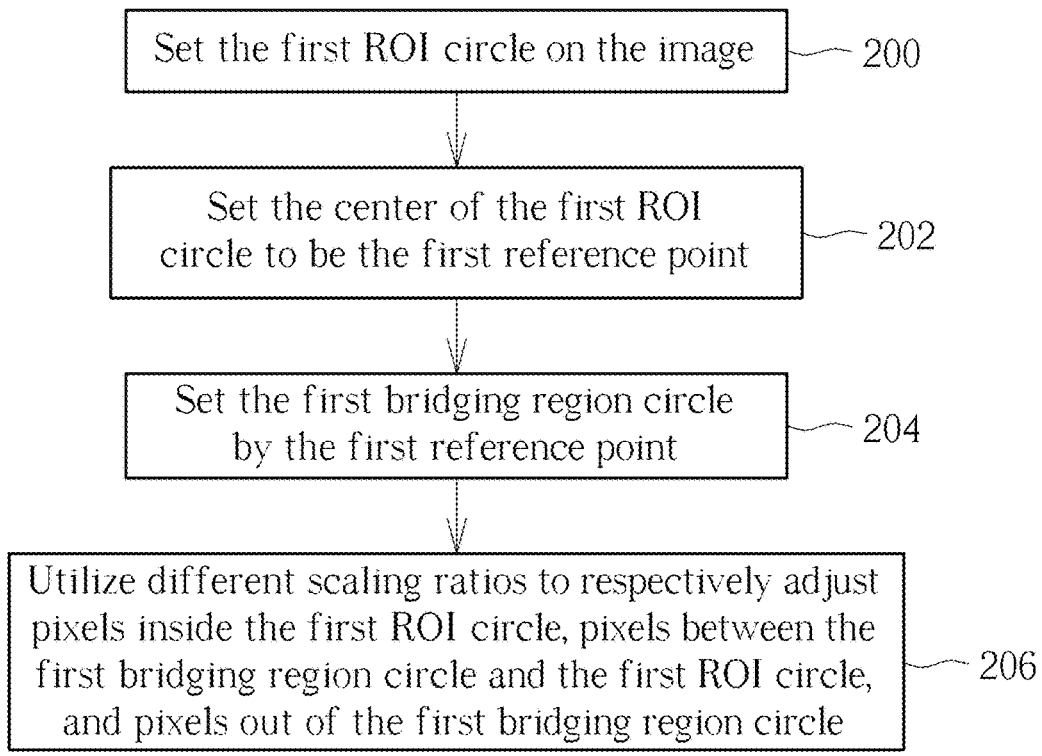
FIG. 2 is a flowchart of varying a scaling ratio for different regions on an image according to the embodiment of the present invention.
Figure 3:
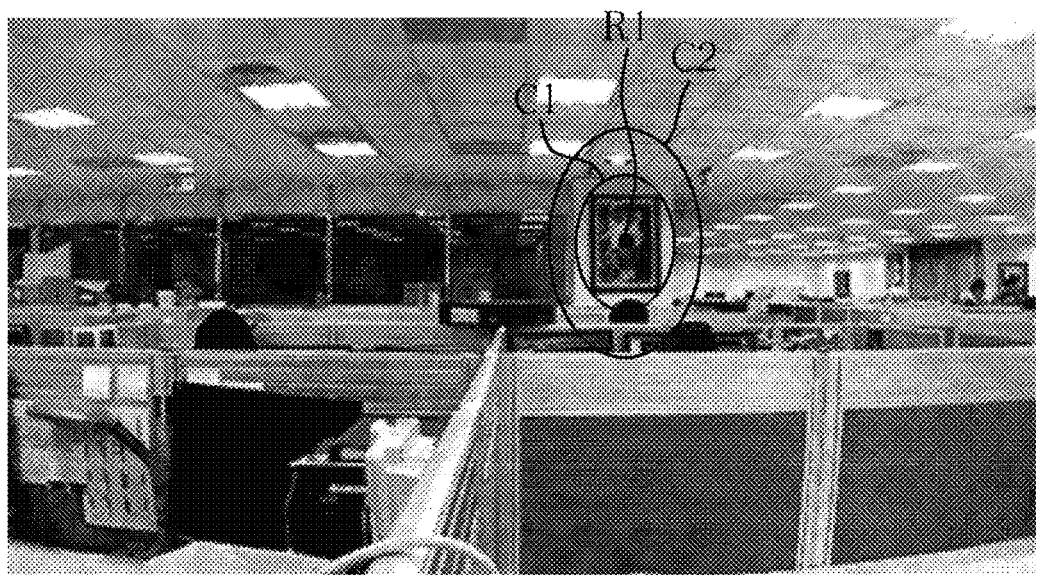
FIG. 3 is a diagram of setting regions on the image according to the embodiment of the present invention.
Figure 4:
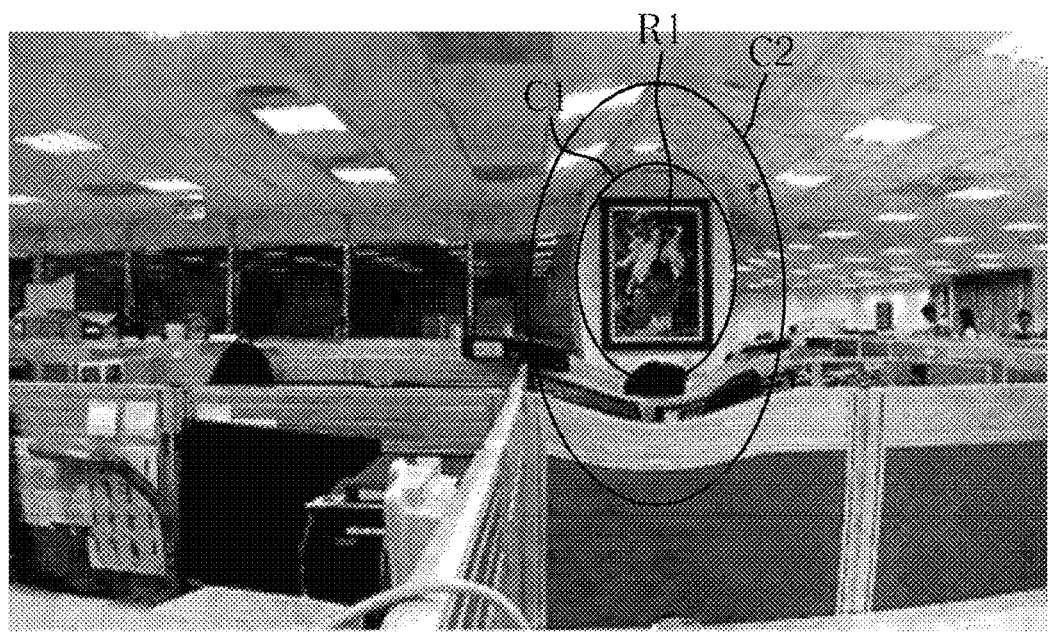
FIG. 4 is a diagram of the adjusted image processed by the image adjusting method illustrated in FIG. 2.

Please refer to FIG. 2 to FIG. 4. FIG. 2 is a flow chart of varying the scaling ratio for different regions on the image according to the embodiment of the present invention. FIG. 3 is a diagram of setting regions on the image according to the embodiment of the present invention. FIG. 4 is a diagram of the adjusted image processed by the image adjusting method illustrated in FIG. 2. First, step 200 is executed that the image adjusting method sets a first ROI circle C1 on the image. A range of the first ROI circle C1 contains a region purposed to keep high resolution within the image, and a specific object located inside the region can be clearly distinguished. Generally, the first ROI circle C1 can be set manually; furthermore, movement detection algorithm, object recognition algorithm (such as human face recognition or license plate recognition) and a movement detector can be utilized to distinguish the specific object and set the first ROI circle C1 automatically. In some embodiments of the present invention, the first ROI circle C1 can be a circular form, an elliptical form, or any kind of round shape.

The image adjusting method may set the first ROI circle C1 according to an input signal generated by the user. The user can mark the region of interest (ROI) by any shapes (such as the circular form, the square form, the elliptical form or the polygonal form), and the foresaid input signal is generated accordingly. The control unit 14 or the processing unit 18 receives the input signal to obtain length and width information of the region of interest, the first ROI circle C1 is automatically set on the image, and the first ROI circle C1 automatically set is a minimal circle capable of containing the region of interest designated by the user.

Step 202 is executed that the image adjusting method sets a center of the first ROI circle C1 to be a first reference point R1. While the first ROI circle C1 is the circular form, the first reference point R1 is a circle center of circular form; while the first ROI circle C1 is the elliptical form, the first reference point R1 is a regional center of the elliptical form. Application of the center for the ROI circle is not limited to the above-mentioned embodiment, and depends on actual demand. In step 204, the image adjusting method sets a first bridging region circle C2 by the first reference point R1. A dimension of the first bridging region circle C2 is greater than a dimension of the first ROI circle C1. As the image adjusting method is executed, a scaling ratio applied to the region located between the first bridging region circle C2 and the first ROI circle C1 is different from scaling ratios applied to the region of interest (such like the region inside the first ROI circle C1) and the region of non-interest (such like the region out of the first bridging region circle C2), so as to naturally stitch deformed portions of the region of interest and the region of non-interest.

Final, step 206 is executed that the image adjusting method utilizes the first scaling ratio S1 to adjust pixels inside the first ROI circle C1, utilizes the second scaling ratio S2 to adjust pixels between the first bridging region circle C2 and the first ROI circle C1, and utilizes the third scaling ratio S3 to adjust pixels out of the first bridging region circle C2; therefore, values of the first scaling ratio S1 is controlled to maintain high resolution of the portion within the first ROI circle C1. Generally, the first scaling ratio S1 is preferably greater than the third scaling ratio S3, to clearly distinguish the portion within the first ROI circle C1. The first scaling ratio S1 further can be smaller than or equal to the third scaling ratio S3 optionally. Any design having the first scaling ratio S1 and the third scaling ratio S3 both greater than the second scaling ratio S2 conforms to a scope of the present invention, and a detailed description is omitted herein for simplicity.

Figure 5:
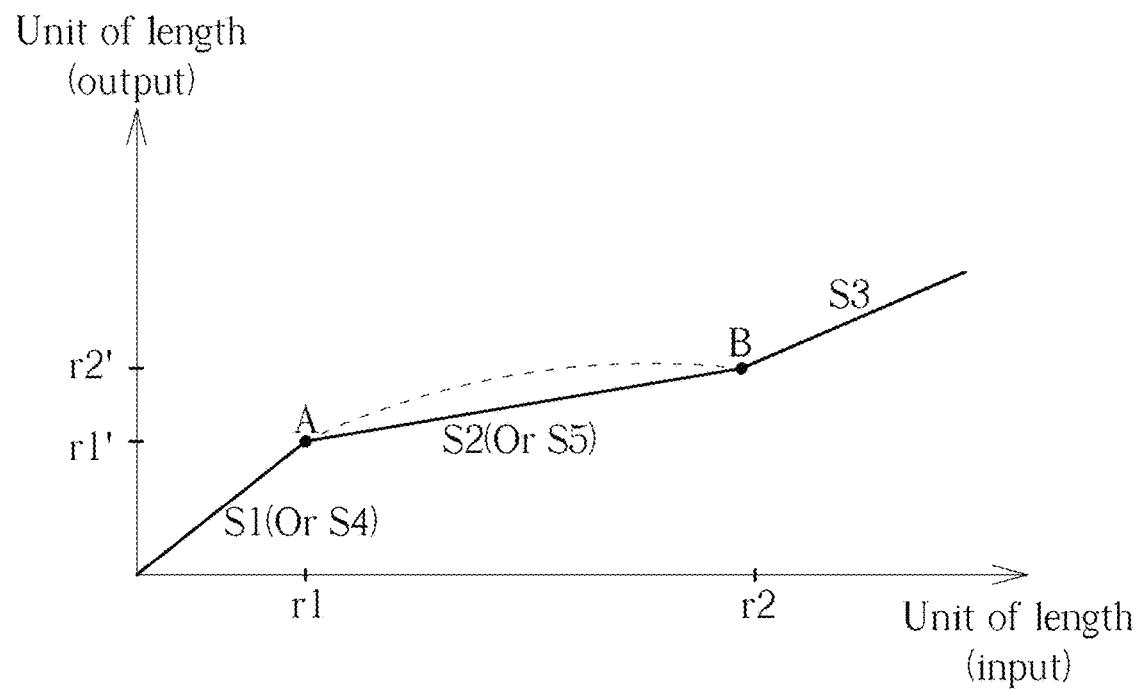
FIG. 5 is a diagram of showing relation between the scaling ratios and the related regions according to the embodiment of the present invention.

Please refer to FIG. 3 to FIG. 5. FIG. 5 is a diagram of showing relation between the scaling ratios and the related regions according to the embodiment of the present invention. For example, a radius r1 of the first ROI circle C1 before adjustment equals 1 unit of length, a radius r2 of the first bridging region circle C2 before adjustment equals 4 units of length. The first scaling ratio S1 equals 2/3, so the adjusted radius r1' equals 2/3 unit of length; the third scaling ratio S3 equals 1/3, so the adjusted radius r2' equals 4/3 unit of length. The pixels located between the first ROI circle C1 and the first bridging region circle C2 are adjusted by the second scaling ratio S2 (which equals 2/9). Thus, most regions (which is out of the first bridging region circle C2) of the image are adjusted by the third scaling ratio S3 to decrease file quantity, the portion inside the first ROI circle C1 is adjusted by the first scaling ratio S1 to maintain preferred resolution, the region between the first ROI circle C1 and the first bridging region circle C2 is adjusted by the second scaling ratio S2 to naturally stitch portions on different regions of the image. Values of the first scaling ratio, the second scaling ratio and the third scaling ratio are not limited to the above-mentioned embodiment, which depends on design demand.

The first scaling ratio S1, the second scaling ratio S2 and/or the third scaling ratio S3 can be constant values indicated by slopes of oblique lines shown in FIG. 5. For example, the slope of the straight line between an original point O (which represents the first reference point R1) and a turning point A equals the first scaling ratio S1, the slope of the straight line between the turning point A and a turning point B equals the second scaling ratio S2, the slope of the straight line on the right of turning point B equals the third scaling ratio S3. Moreover, the first scaling ratio S1, the second scaling ratio S2 and/or the third scaling ratio S3 can be varied according to a distance of a pixel relative to the first reference point R1. For example, at least one or more of the line segment between the original O (which represents the first reference point R1) and the turning point A, the line segment between the turning point A and the turning point B, and/or the line segment on the right of turning point B can be a curved line (such as the dotted line shown in FIG. 5).

Figure 6:
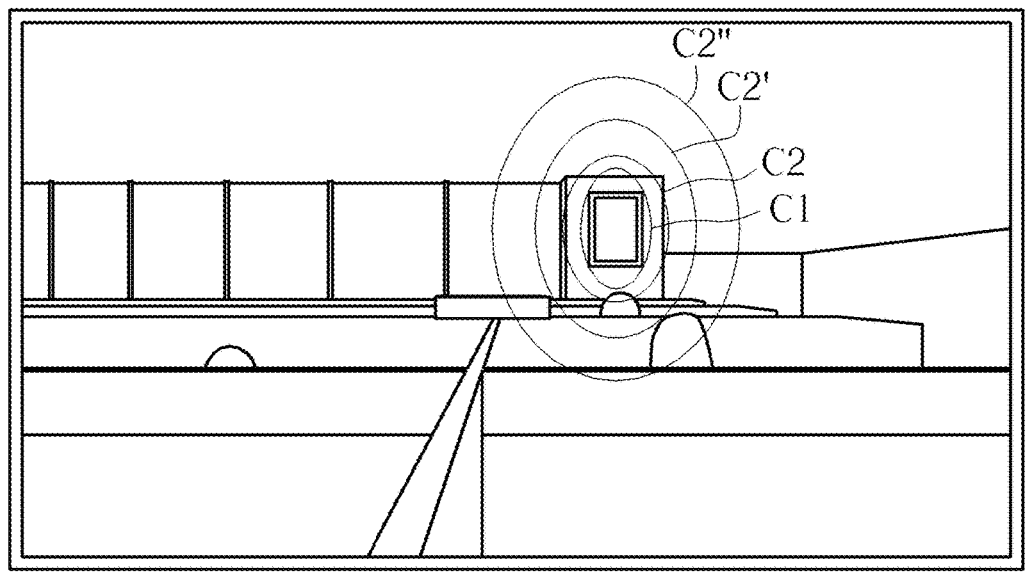
FIG. 6 is a diagram of setting a plurality of bridging region circles on the image according to the embodiment of the present invention.

Please refer to FIG. 6. FIG. 6 is a diagram of setting a plurality of bridging region circles on the image according to the embodiment of the present invention. The image adjusting method of the present invention can set the plurality of bridging region circles, such as the first bridging region circles C2, C2' and C2", while step 204 is executed. Dimensions of the first bridging region circles C2, C2' and C2" are different from each other. Pixels between the region of interest and the region of non-interest can be adjusted by different scaling ratios according to relative variation of its distance, and portions on different regions of the adjusted image can be stitched naturally. While the two first bridging region circles C2 and C2' are set on the image, the scaling ratio applied to the pixels between the first bridging region circle C2 and the first ROI circle C1 is different form the scaling ratio applied to the pixels between the first bridging region circle C2' and the first bridging region circle C2. While the three first bridging region circles C2, C2' and C2" are set on the image, the scaling ratio applied to the pixels between the first bridging region circle C2' and the adjacent smaller first bridging region circle C2 is different from the scaling ratio applied to the pixels between the first bridging region circle C2' and the adjacent larger first bridging region circle C2".

Figure 7:
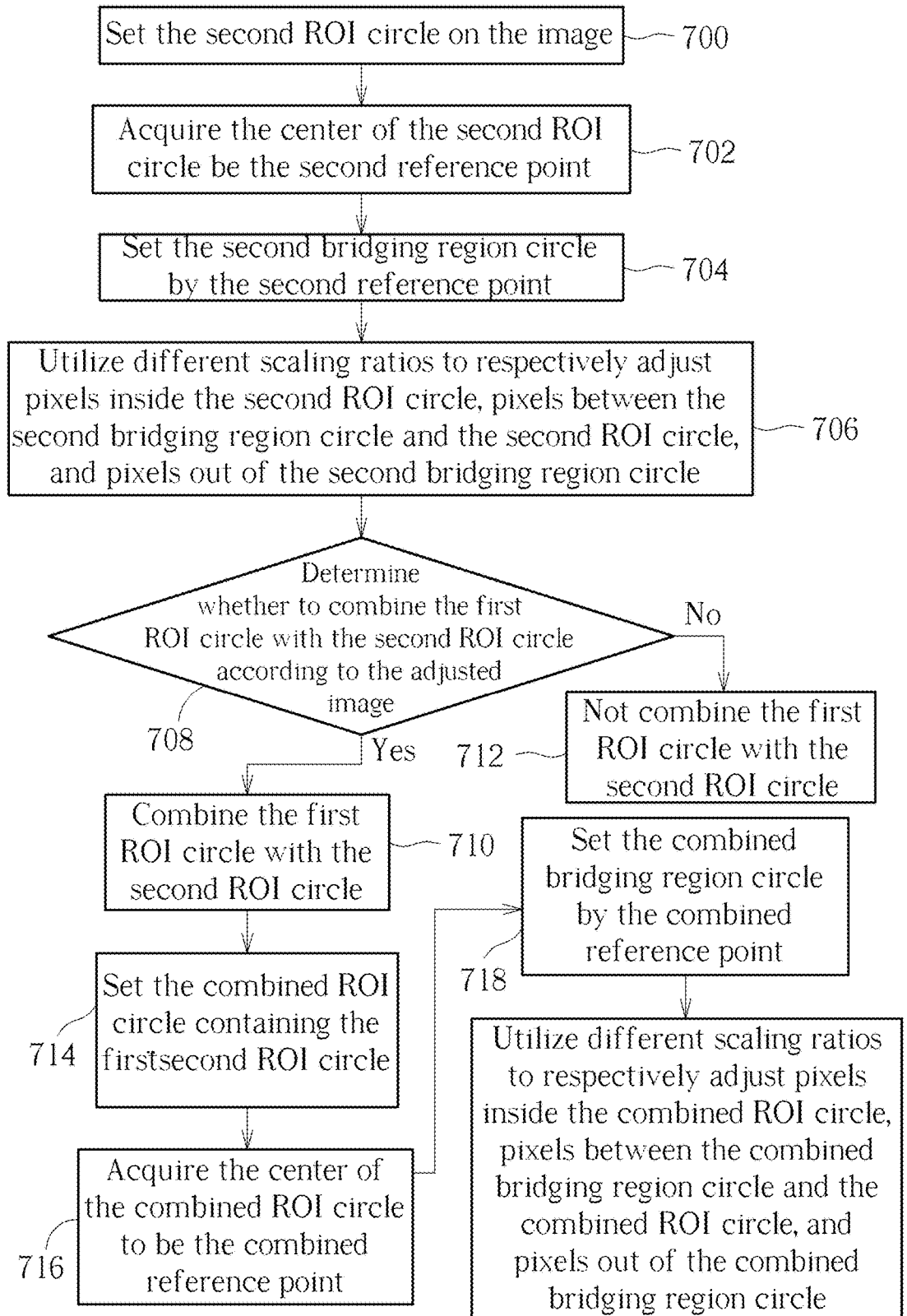
FIG. 7 is a flow chart of determining whether to combine the plurality of regions of interest on the image according to the embodiment of the present invention.
Figure 8:
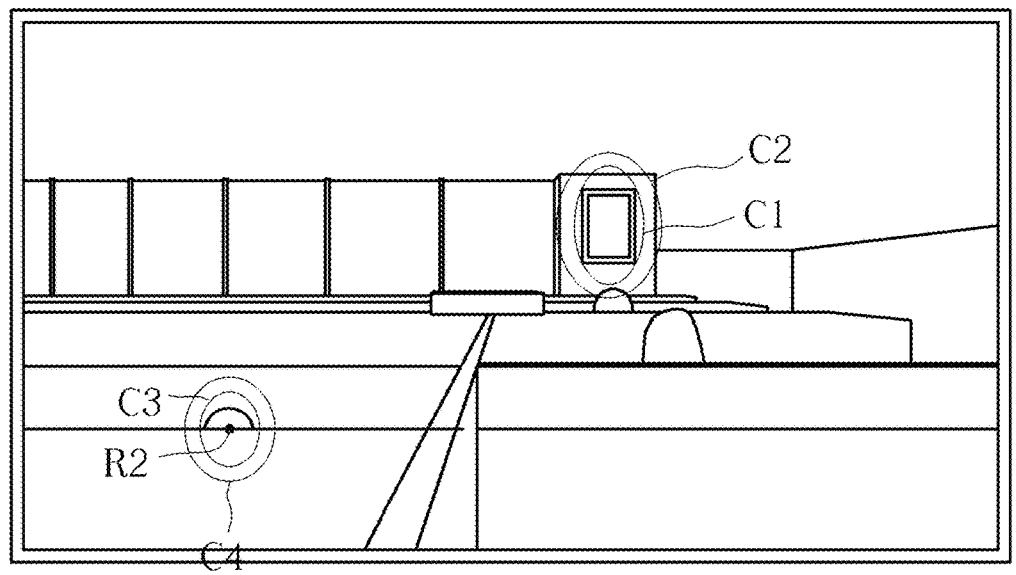
FIG. 8 is a diagram of setting the plurality of regions of interest on the image according to the embodiment of the present invention.
Figure 9:
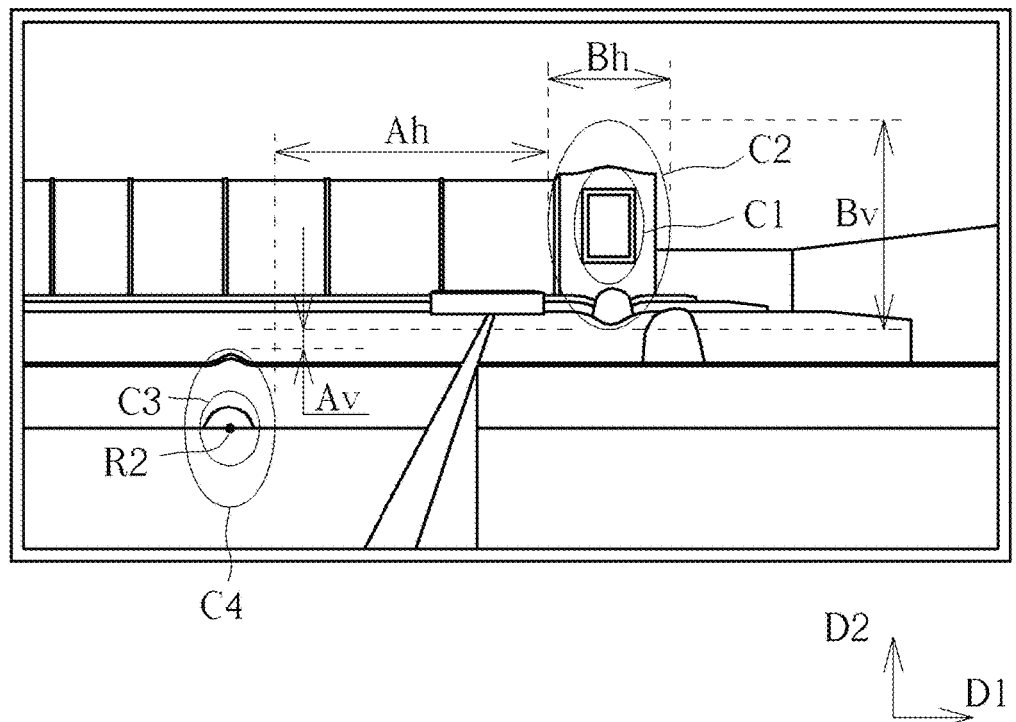
FIG. 9 is a diagram of the image processed by the image adjusting method shown in FIG. 8.
Figure 10:
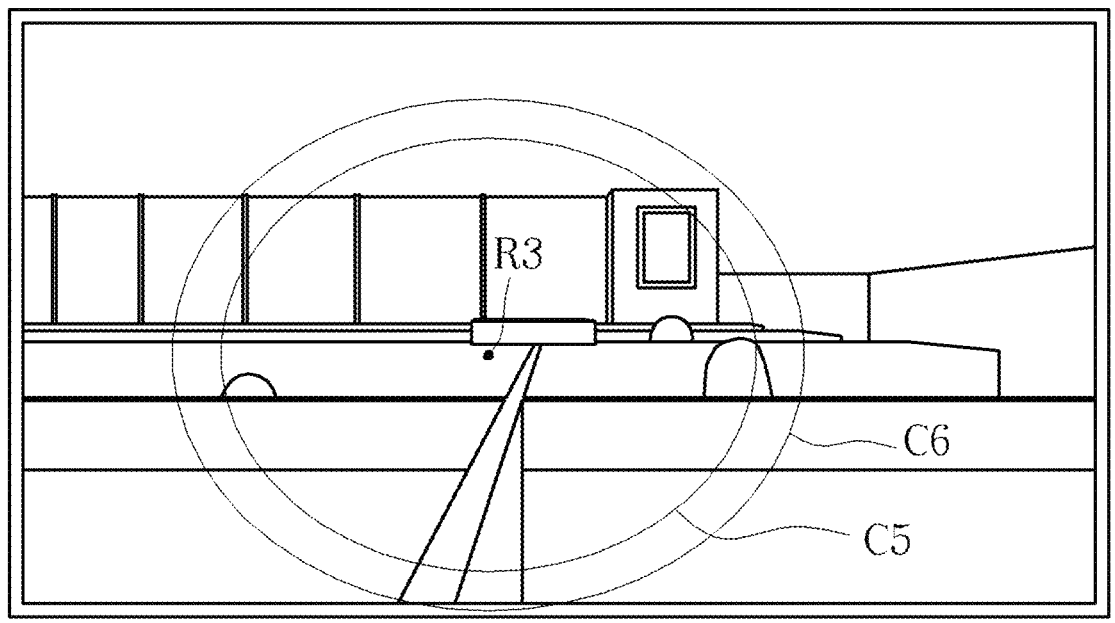
FIG. 10 is a diagram of combining the plurality of regions of interest on the image according to the embodiment of the present invention.

Please refer to FIG. 7 to FIG. 10. FIG. 7 is a flow chart of determining whether to combine the plurality of regions of interest on the image according to the embodiment of the present invention. FIG. 8 is a diagram of setting the plurality of regions of interest on the image according to the embodiment of the present invention. FIG. 9 is a diagram of the image processed by the image adjusting method shown in FIG. 8. FIG. 10 is a diagram of combining the plurality of regions of interest on the image according to the embodiment of the present invention. The image adjusting method illustrated in FIG. 7 belongs to the image adjusting method illustrated in FIG. 2, and two regions of interest are cited as an instance. The image adjusting method further executes steps 700, 702 and 704, as shown in FIG. 8, the second ROI circle C3 is set on the image, the center of the second ROI circle C3 is acquired to be the second reference point R2, and the second bridging region circle C4 which has a dimension larger than a dimension of the second ROI circle C3 is set by the second reference point R2 accordingly. Then, step 706 is executed that the image adjusting method utilizes the fourth scaling ratio S4 to adjust pixels inside the second ROI circle C3, utilizes the fifth scaling ratio S5 to adjust pixels between the second bridging region circle C4 and the second ROI circle C3, and utilizes the third scaling ratio S3 to adjust pixels out of the second bridging region circle C4. The scaling ratios mentioned in step 706 can be varied according to statement described in FIG. 5. Besides, the fourth scaling ratio S4 and the third scaling ratio S3 are greater than the fifth scaling ratio S5. The first scaling ratio S1, the second scaling ratio S2, the fourth scaling ratio S4 and the fifth scaling ratio S5 can be identical with each other or different from each other. This embodiment sets adjustment of the second ROI circle C3 and related regions while the first ROI circle C1 and related regions have been adjusted; however, setup sequence of the image adjusting method is not limited to the above-mentioned embodiment. The present invention further can set the first ROI circle C1, the second ROI circle C3 and the related regions and then execute steps of adjustment, which depend on actual demand.

While regions of the image are adjusted accordingly, the image adjusting method further executes step 708 to determine whether to combine the first ROI circle C1 with the second ROI circle C3 according to the adjusted image. Step 710 is executed as a determination is positive, and step 712 is executed as the determination is negative. In step 708, a combination of the first ROI circle C1 and the second ROI circle C3 is indispensable while the adjusted first bridging region circle C2 and the adjusted second bridging region circle C4 are overlapped along a transverse direction D1 or a vertical direction D2. It is to say, the image adjusting method can choose a large one of the adjusted first bridging region circle C2 and the adjusted second bridging region circle C4 (in this embodiment, the first bridging region circle C2 has the large dimension shown in FIG. 9), acquire a first dimensional parameter Bh and a second dimensional parameter By of the adjusted first bridging region circle C2 respectively along the transverse direction D1 and the vertical direction D2, acquire a first boundary interval Ah and a second boundary interval Av between the adjusted first bridging region circle C2 and the adjusted second bridging region circle C4 respectively along the transverse direction D1 and the vertical direction D2, and calculate a first ratio value (Ah/Bh) of the first boundary interval Ah to the first dimensional parameter Bh and a second ratio value (Av/Bv) of the second boundary interval Av to the second dimensional parameter By. While a large one of the first ratio value (Ah/Bh) and the second ratio value (Av/Bv) is lower than a threshold, the first bridging region circle C2 and the second bridging region circle C4 are close or overlapped, and the combination of first ROI circle C1 and the second ROI circle C3 is indispensable.

After the first ROI circle C1 and the second ROI circle C3 are combined, the image adjusting method further executes steps 714, 716 and 718, as shown in FIG. 10, a combined ROI circle C5 which contains the first ROI circle C1 and the second ROI circle C3 is set, a center of the combined ROI circle C5 is acquired to be a combined reference point R3, and then a combined bridging region circle C6 is set by the combined reference point R3. A dimension of the combined bridging region circle C6 is larger than a dimension of the combined ROI circle C5, to define a buffer region between different regions that are adjusted by different scaling ratios. Final, step 720 is executed to utilize a sixth scaling ratio, a seventh scaling ratio and an eighth scaling ratio to respectively adjust pixels inside the combined ROI circle C5, pixels between the combined bridging region circle C6 and the combined ROI circle C5, and pixels out of the combined bridging region circle C6. The sixth scaling ratio and the eighth scaling ratio are greater than the seventh scaling ratio.

In conclusion, the image adjusting method of the present invention defines the ROI circle for containing the specific object on the image, and sets the bridging region circle by the center of the ROI circle (the dimension of the bridging region circle is larger than the dimension of the ROI circle). Pixels inside the ROI circle, between the ROI circle and the bridging region circle, and out of the bridging region circle are respectively adjusted by different scaling ratios. The image adjusting method can utilize affine transform technique and/or perspective transform technique to execute projection transformation of blocks on the image by software or built-in hardware, so as to effectively increase operation efficiency of coordinate transformation. The scaling ratio applied to the pixels inside the ROI circle is larger, so that the portion inside the ROI circle is slightly adjusted for maintaining high resolution about the specific object within the image; the scaling ratio applied to the pixels out of the bridging region circle is designed according to total scaling quantity of the image; the scaling ratio applied to the pixels between the ROI circle and the bridging region circle is preferably smaller than the foresaid two scaling ratios, so as to naturally stitch the deformed portions on the region of interest and the region of non-interest. In addition, the ROI circle and the bridging region circle of the present invention can be the circular form, the elliptical form, or any kind of round shape. The image adjusting method and the related camera and the image processing system of the present invention have advantages of preferred image scaling effect and high resolution.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image adjusting method capable of varying scaling ratios according to different regions of an image, the image adjusting method comprising:
    setting a first ROI (region of interest) circle on the image;
    acquiring a center of the first ROI circle to be a first reference point;
    setting at least one first bridging region circle by the first reference point, wherein a dimension of the first bridging region circle is greater than a dimension of the first ROI circle;
    utilizing a first scaling ratio, a second scaling ratio and a third scaling ratio to respectively adjust pixels inside the first ROI circle, pixels between the first bridging region circle and the first ROI circle, and pixels between the first bridging region circle and a boundary of the image, so as to vary resolution of the whole image;
    setting a second ROI (region of interest) circle on the image;
    acquiring a center of the second ROI circle to be a second reference point,
    setting at least one second bridging region circle by the second reference point, wherein a dimension of the second bridging region circle is greater than a dimension of the second ROI circle;
    utilizing a fourth scaling ratio, a fifth scaling ratio and the third scaling ratio to respectively adjust pixels inside the second ROI circle, pixels between the second bridging region circle and the second ROI circle, and pixels out of the second bridging region circle;
    determining whether to combine the first ROI circle with the second ROI circle; and
    combining the first ROI circle with the second ROI circle while a determination of combining the first ROI circle with the second ROI circle is confirmed.

2. The image adjusting method of claim 1, further comprising:
    setting the first ROI circle over a specific object within the image.

3. The image adjusting method of claim 1, wherein the first scaling ratio and the third scaling ratio are greater than the second scaling ratio, and the first scaling ratio, the second scaling ratio and the third scaling ratio are constant or varied according to a distance of a pixel relative to the first reference point.

4. The image adjusting method of claim 1, wherein a plurality of first bridging region circles is set on the image, dimensions of the plurality of first bridging region circles are different from each other, a scaling ratio applied to pixels between each first bridging region circle and another adjacent smaller first bridging region circle is different from a scaling ratio applied to pixels between the each first bridging region circle and another adjacent larger first bridging region circle.

5. The image adjusting method of claim 1, wherein a step of determining whether to combine the first ROI circle with the second ROI circle comprises:
    determining a combination of the first ROI circle and the second ROI circle is indispensable while the adjusted first bridging region circle and the adjusted second bridging region circle are overlapped along a transverse direction or a vertical direction.

6. The image adjusting method of claim 1, wherein a step of determining whether to combine the first ROI circle with the second ROI circle comprises:
    acquiring a first dimensional parameter and a second dimensional parameter of a large one of the adjusted first bridging region circle and the adjusted second bridging region circle respectively along a transverse direction and a vertical direction;
    acquiring a first boundary interval along the transverse direction and a second boundary interval along the vertical direction between the adjusted first bridging region circle and the adjusted second bridging region circle;
    calculating a first ratio value of the first dimensional parameter to the first boundary interval and a second ratio value of the second dimensional parameter to the second boundary interval; and
    determining to combine the first ROI circle with the second ROI circle while the first ratio value and the second ratio value are smaller than a threshold.

7. The image adjusting method of claim 1, wherein a step of combining the first ROI circle with the second ROI circle while the determination of combining the first ROI circle with the second ROI circle is confirmed comprises:
    setting a combined ROI (region of interest) circle containing the first ROI circle and the second ROI circle;
    acquiring a center of the combined ROI circle to be a combined reference point;
    setting at least one combined bridging region circle having a dimension larger than a dimension of the combined ROI circle by the combined reference point; and
    utilizing a sixth scaling ratio, a seventh scaling ratio and a eighth scaling ratio to respectively adjust pixels inside the combined ROI circle, pixels between the combined bridging region circle and the combined ROI circle, and pixels out of the combined bridging region circle, wherein the sixth scaling ratio and the eighth scaling ratio are greater than the seventh scaling ratio.

8. The image adjusting method of claim 1, further comprising:
    receiving an input signal; and
    setting the first ROI circle on the image according to the input signal.

9. A camera with an image adjusting function, the camera comprising:
    an image sensor adapted to capture at least one image; and
    a processing unit coupled to the image sensor and adapted to execute an image adjusting method of setting a first ROI (region of interest) circle on the image, acquiring a center of the first ROI circle to be a first reference point, setting at least one first bridging region circle by the first reference point, and utilizing a first scaling ratio, a second scaling ratio and a third scaling ratio to respectively adjust pixels inside the first ROI circle, pixels between the first bridging region circle and the first ROI circle, and pixels between the first bridging region circle and a boundary of the image, so as to vary resolution of the whole image, wherein a dimension of the first bridging region circle is greater than a dimension of the first ROI circle, the processing unit further executing the image adjusting method of setting a second ROI (region of interest) circle on the image, acquiring a center of the second ROI circle to be a second reference point, setting at least one second bridging region circle by the second reference point, utilizing a fourth scaling ratio, a fifth scaling ratio and the third scaling ratio to respectively adjust pixels inside the second ROI circle, pixels between the second bridging region circle and the second ROI circle, and pixels out of the second bridging region circle, determining whether to combine the first ROI circle with the second ROI circle, and combining the first ROI circle with the second ROI circle while a determination of combining the first ROI circle with the second ROI circle is confirmed, wherein a dimension of the second bridging region circle is greater than a dimension of the second ROI circle.

10. The camera of claim 9, wherein the processing unit further executes the image adjusting method of setting the first ROI circle over a specific object within the image.

11. The camera of claim 9, wherein the first scaling ratio and the third scaling ratio are greater than the second scaling ratio, and the first scaling ratio, the second scaling ratio and the third scaling ratio are constant or varied according to a distance of a pixel relative to the first reference point.

12. The camera of claim 9, wherein a plurality of first bridging region circles is set on the image, dimensions of the plurality of first bridging region circles are different from each other, a scaling ratio applied to pixels between each first bridging region circle and another adjacent smaller first bridging region circle is different from a scaling ratio applied to pixels between the each first bridging region circle and another adjacent larger first bridging region circle.

13. The camera of claim 9, wherein the processing unit executes the image adjusting method of determining whether to combine the first ROI circle with the second ROI circle is represented as the processing unit determines a combination of the first ROI circle and the second ROI circle is indispensable while the adjusted first bridging region circle and the adjusted second bridging region circle are overlapped along a transverse direction or a vertical direction.

14. The camera of claim 9, wherein the processing unit executes the image adjusting method of determining whether to combine the first ROI circle with the second ROI circle is represented as the processing unit acquires a first dimensional parameter and a second dimensional parameter of a large one of the adjusted first bridging region circle and the adjusted second bridging region circle respectively along a transverse direction and a vertical direction, acquires a first boundary interval along the transverse direction and a second boundary interval along the vertical direction between the adjusted first bridging region circle and the adjusted second bridging region circle, calculates a first ratio value of the first dimensional parameter to the first boundary interval and a second ratio value of the second dimensional parameter to the second boundary interval, and determines to combine the first ROI circle with the second ROI circle while the first ratio value and the second ratio value are smaller than a threshold.

15. The camera of claim 9, wherein the processing unit executes the image adjusting method of combining the first ROI circle with the second ROI circle while the determination of combining the first ROI circle with the second ROI circle is confirmed is represented as the processing unit sets a combined ROI (region of interest) circle containing the first ROI circle and the second ROI circle, acquires a center of the combined ROI circle to be a combined reference point, sets at least one combined bridging region circle having a dimension larger than a dimension of the combined ROI circle by the combined reference point, and utilizes a sixth scaling ratio, a seventh scaling ratio and a eighth scaling ratio to respectively adjust pixels inside the combined ROI circle, pixels between the combined bridging region circle and the combined ROI circle, and pixels out of the combined bridging region circle, wherein the sixth scaling ratio and the eighth scaling ratio are greater than the seventh scaling ratio.

16. The camera of claim 9, wherein further executes the image adjusting method of receiving an input signal, and setting the first ROI circle on the image according to the input signal.

17. An image processing system capable of varying scaling ratios according to different regions on an image to provide preferred resolution for a ROI (region of interest) circle on the image, wherein the image processing system is applied to execute an image adjusting method of setting a first ROI (region of interest) circle on the image, acquiring a center of the first ROI circle to be a first reference point, setting at least one first bridging region circle by the first reference point, and utilizing a first scaling ratio, a second scaling ratio and a third scaling ratio to respectively adjust pixels inside the first ROI circle, pixels between the first bridging region circle and the first ROI circle, and pixels between the first bridging region circle and a boundary of the image, so as to vary resolution of the whole image, wherein a dimension of the first bridging region circle is greater than a dimension of the first ROI circle, the image processing system is further applied to execute the image adjusting method of setting a second ROI (region of interest) circle on the image, acquiring a center of the second ROI circle to be a second reference point, setting at least one second bridging region circle by the second reference point, utilizing a fourth scaling ratio, a fifth scaling ratio and the third scaling ratio to respectively adjust pixels inside the second ROI circle, pixels between the second bridging region circle and the second ROI circle, and pixels out of the second bridging region circle, determining whether to combine the first ROI circle with the second ROI circle, and combining the first ROI circle with the second ROI circle while a determination of combining the first ROI circle with the second ROI circle is confirmed, wherein a dimension of the second bridging region circle is greater than a dimension of the second ROI circle.

* * * * *